(12) United States Patent
Kato et al.

(10) Patent No.: US 6,240,738 B1
(45) Date of Patent: Jun. 5, 2001

(54) REFRIGERANT RELIEF DEVICE FOR VEHICLE AIR CONDITIONER

(75) Inventors: Yuichi Kato, Tokyo; Koji Kikuchi, Kanagawa-ken; Satoshi Ogihara, Tochigi-ken, all of (JP)

(73) Assignee: Nissan Motor., Ltd., Kanagawa-Ken (JP)

( * ) Notice: Subject to any disclaimer, the term of this patent is extended or adjusted under 35 U.S.C. 154(b) by 0 days.

(21) Appl. No.: 09/504,908

(22) Filed: Feb. 16, 2000

(30) Foreign Application Priority Data

Feb. 16, 1999 (JP) .................................................. 11-037514

(51) Int. Cl.$^7$ ...................................................... B60H 1/32

(52) U.S. Cl. ............................................... 62/239; 62/244

(58) Field of Search .............................. 62/239, 244, 133

(56) References Cited

U.S. PATENT DOCUMENTS

| 3,933,005 | * | 1/1976 | Beltz | 62/228 |
| 4,133,186 | * | 1/1979 | Brucken et al. | 62/228 |
| 5,794,915 | * | 8/1998 | Shimizu et al. | 251/127 |

FOREIGN PATENT DOCUMENTS 9-76741 * 3/1997 (JP) .

* cited by examiner

*Primary Examiner*—Michael Buiz
*Assistant Examiner*—Mohammad M. Ali
(74) *Attorney, Agent, or Firm*—McDermott, Will & Emery

(57) ABSTRACT

A refrigerant relief device for a vehicle air conditioner according to the present invention is provided with a detection section detecting an impact applied to the vehicle and a relief section relieving a refrigerant at a high pressure side of an air conditioning cycle of the vehicle air conditioner to the outside of the vehicle air conditioner when the sensor detects the impact.

12 Claims, 4 Drawing Sheets

REFRIGERANT RELIEF DEVICE FOR VEHICLE AIR CONDITIONER

BACKGROUND OF THE INVENTION

The present invention relates to a refrigerant relief device for a vehicle air conditioner and particularly relates to a refrigerant relief device for a vehicle air conditioner provided with a so-called air conditioning cycle.

In the air conditioning cycle of a vehicle air conditioner, a refrigerant is forcedly fed to a condenser by a compressor. In the condenser, the refrigerant is cooled by the heat exchange between the refrigerant and the external air, and then reaches a liquid tank. In the liquid tank, the refrigerant is subjected to gas-liquid separation, the pressure of the refrigerant is reduced by an expansion valve and the refrigerant is supplied to an evaporator. The evaporator conducts the heat exchange between the supplied refrigerant and the air conditioner blow so as cool the blow. The refrigerant heated by the heat exchange in the evaporator reaches the compressor and is forcedly fed again to make the above-stated cycle.

In recent years, various global or environmental issues arise and attract public attention. In this connection, as for the above-stated air conditioning cycle, the change of types of refrigerants used for air conditioning is demanded for fear of the destruction of the ozone layer or the like. As a new refrigerant, carbon dioxide is proposed.

SUMMARY OF THE INVENTION

According to the studies of the inventors of the present invention, however, when carbon dioxide is used as a refrigerant, the pressure of a passage having the high pressure in the air conditioning cycle, for example, the pressure of a passage from the discharge portion of the condenser to the expansion valve, is disadvantageously high relative to that in case of using a conventional refrigerant. This tendency is by no means desirable in consideration that the area in which the air conditioning cycle functions is within a vehicle applied with various external forces and sometimes an impact depending on the travel condition or the like.

It is, therefore, an object of the present invention to provide a refrigerant relief device for a vehicle air conditioner capable of surely, promptly reducing the pressure of the air conditioning cycle when required.

A refrigerant relief device for a vehicle air conditioner according to the present invention is provided with a detection section detecting an impact applied to the vehicle, and a relief section relieving a refrigerant at a high-pressure side of an air conditioning cycle of the vehicle air conditioner to an outside of the air conditioning cycle when the sensor detects the impact.

Also, in other words, a refrigerant relief device for a vehicle air conditioner according to the present invention, is provided with detection means for detecting an impact applied to the vehicle, relief means for relieving a refrigerant at a high pressure side of an air conditioning cycle of the vehicle air conditioner to an outside of the air conditioning cycle, and control means for controlling the relief means so as to relieve the refrigerant at the high pressure side of the air conditioning cycle to the outside of the air conditioning cycle when the detection means detects the impact.

DETAILED DESCRIPTION OF THE PREFERRED EMBODIMENTS

Now, the embodiments of the present invention will be described in detail with reference to the accompanying drawings.

First, description will be given to a refrigerant relief device for a vehicle air conditioner in the first embodiment according to the present invention, while referring to FIGS. 1 to 4.

In FIGS. 1 to 4, reference symbol FR denotes the front side of a vehicle V, L denotes the left side of the vehicle V, R denotes the right side of the vehicle V and UPR denotes the upper side of the vehicle V.

Figure 1:
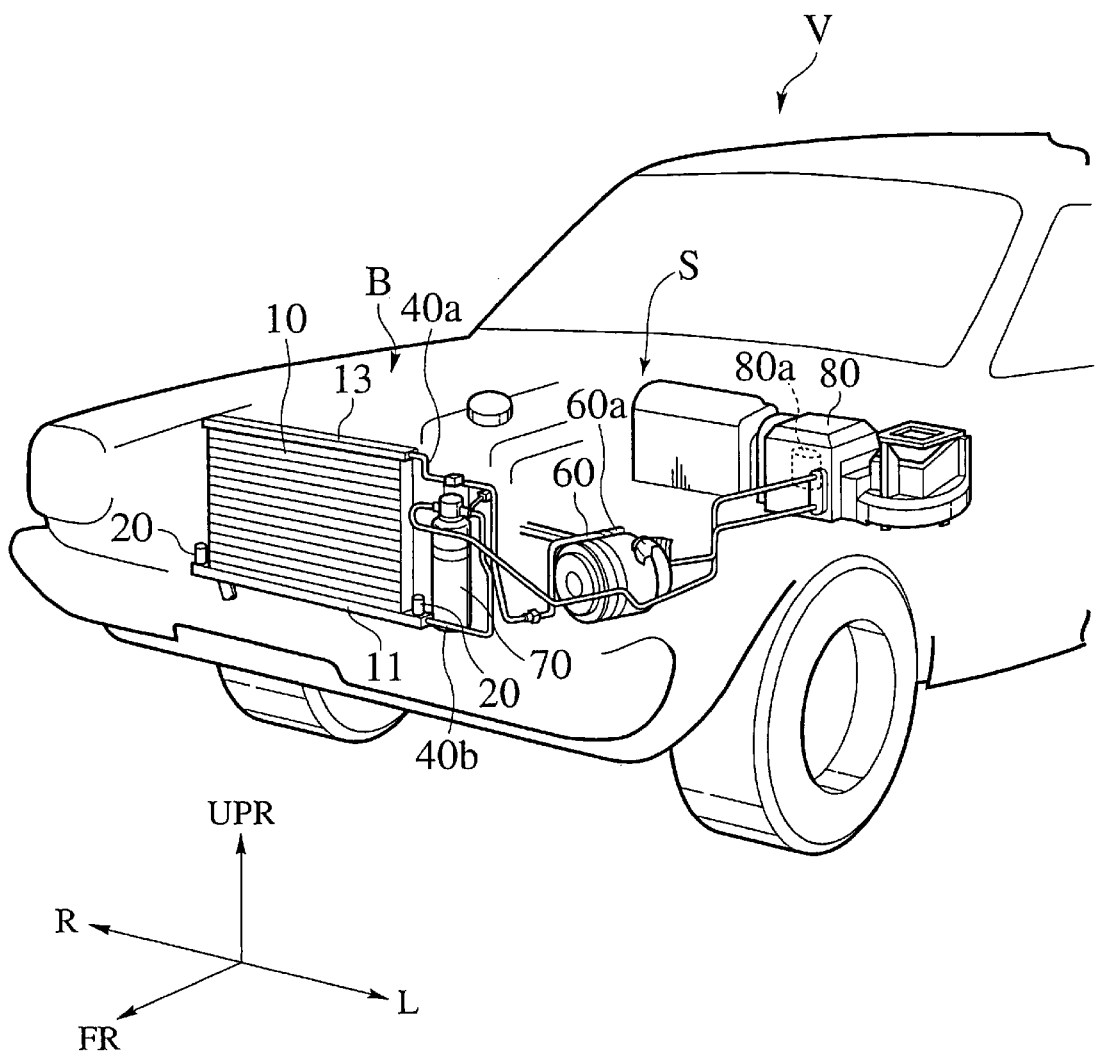
FIG. 1 is a schematic view showing a structure of a vehicle to which a refrigerant relief device for a vehicle air conditioner in the first embodiment according to the present invention is applied.
Figure 2:
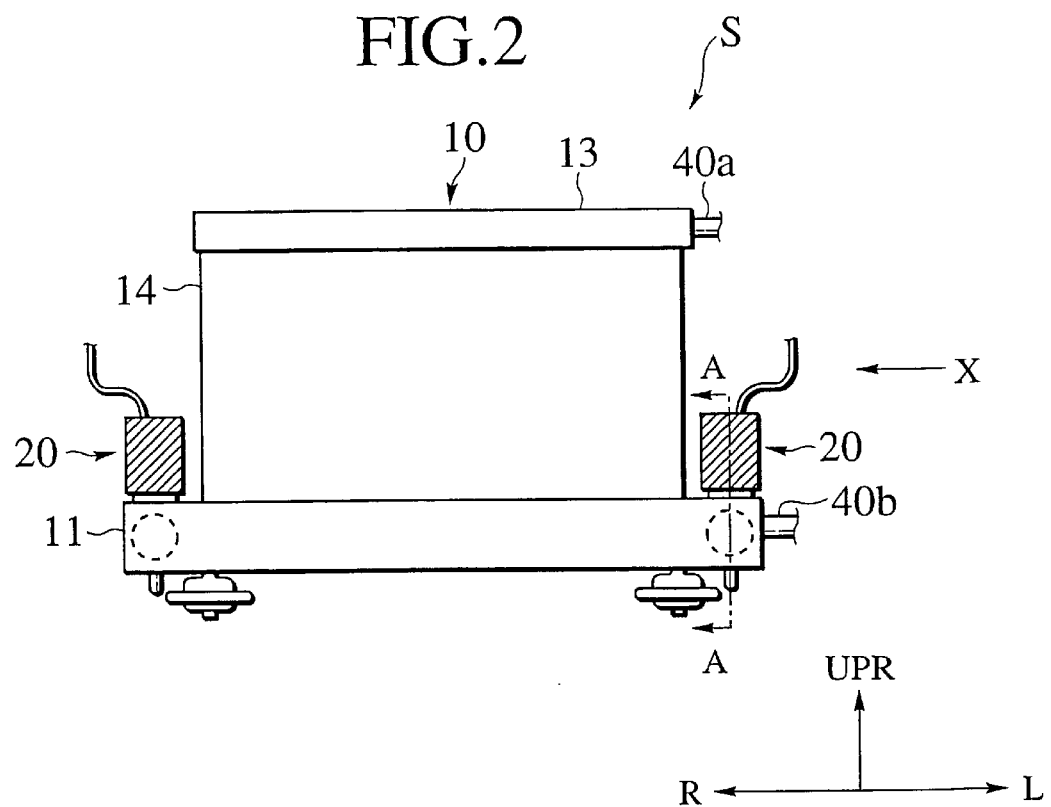
FIG. 2 shows the vehicle air conditioner and the refrigerant relief device, when seen from the front side of the vehicle in the embodiment.
Figure 3:
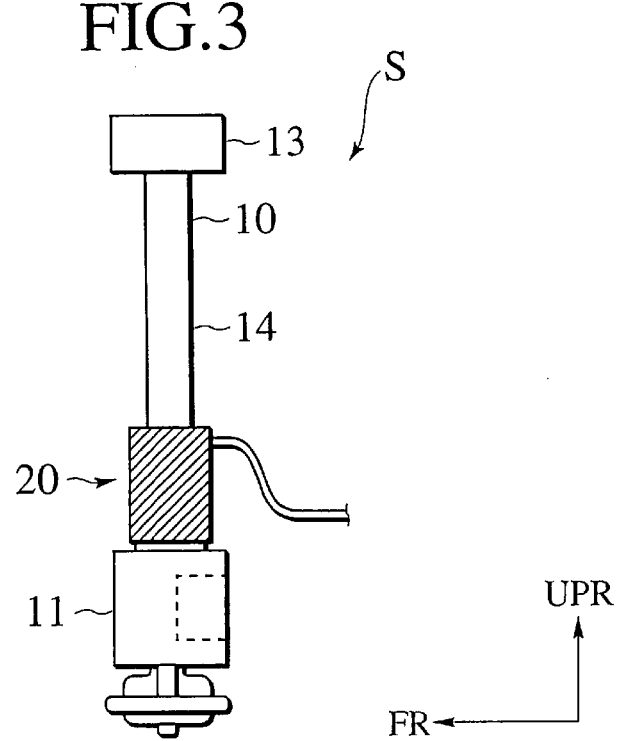
FIG. 3 shows a view seen from X direction of FIG. 2.

In FIGS. 1 to 3, a condenser 10 constitutes a part of the air conditioning cycle of a vehicle air conditioner S which uses carbon dioxide as a refrigerant. The condenser 10 is disposed crosswise at the front portion of an engine room B. The refrigerant compressed by a compressor 60 flows into the upper tank 13 of the condenser 10 from a pipe 40a and reaches a lower tank 11 thereof, while flowing in a core 14 in parallel between the right and left end portions thereof so as to radiate heat into the atmosphere, and then flows into a liquid tank 70 through a pipe 40b. The refrigerant turned into a liquid phase after being subjected to gas-liquid separation in the liquid tank 70, enters into a cooling unit 80 in which the pressure of the refrigerant is reduced by an expansion valve 80a. The pressure-reduced refrigerant absorbs the heat of the air-conditioning blow in an evaporator which is not shown and then flows to the compressor 60.

The lower tank 11 of the condenser 10 is provided with solenoid type relief valves 20 serving as relief means at right and left positions of the tank 11, respectively. Although a single relief valve 20 may suffice, two relief valves 20 allow pressure to be relieved outside more promptly. Each of the solenoid type relief valves 20 has a coil 21 shown in FIG. 4, a movable iron core 22 inserted into the coil 21, a push rod 23 coupled to the movable iron core 22 and a fixed iron core 24 provided below the movable iron core 22. A spool 26 is coupled to the push rod 23 through a joint 25. The spool 26 is inserted into a longitudinal moving space 11A formed in the lower tank 11 to be movable vertically, and sealed by two portions, i.e., the joint 25 and a lower flange portion 26a. The spool 26 is urged upward by a disk spring 27 provided below the flange portion 26a.

Figure 4:
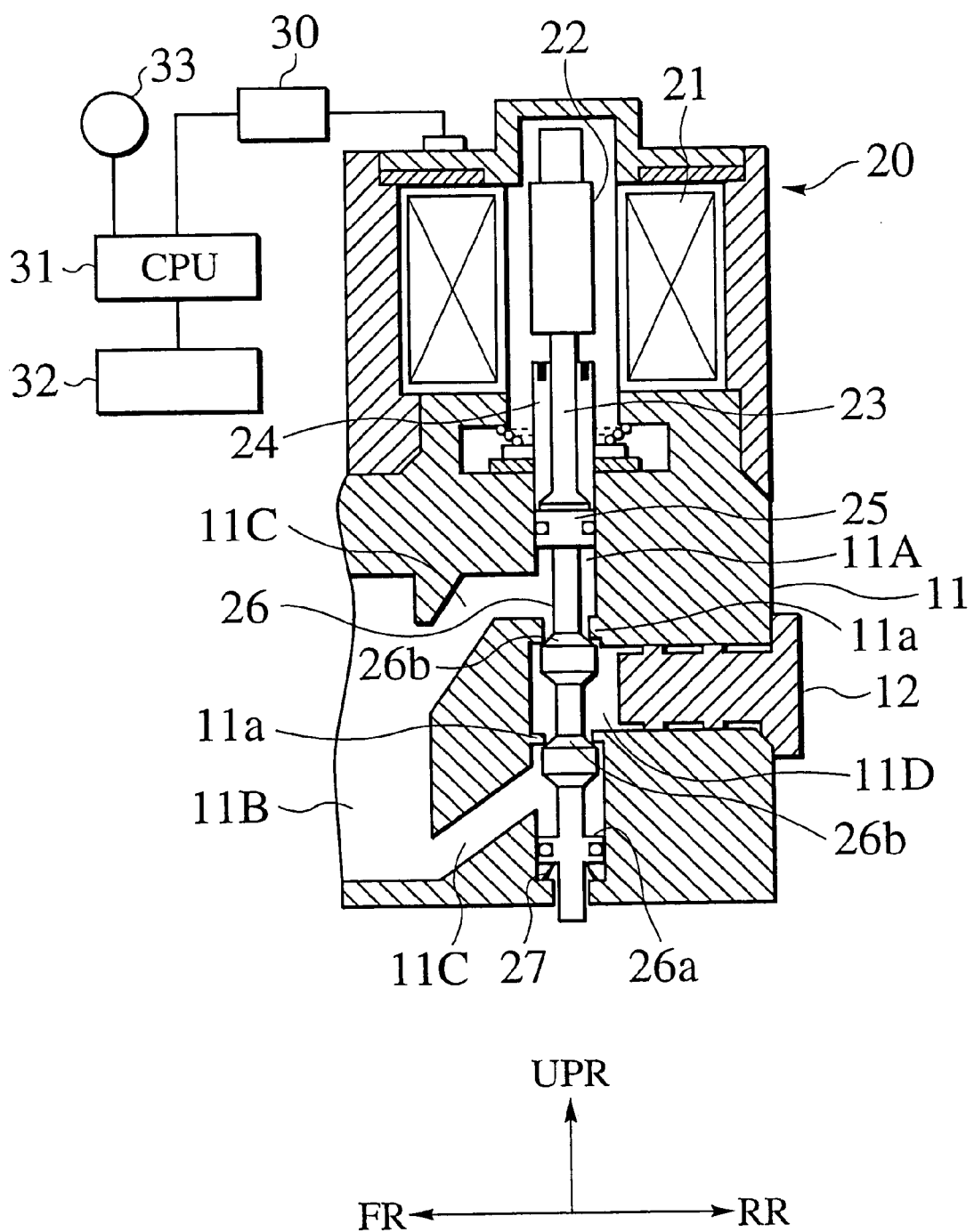
FIG. 4 is a cross-sectional view taken along line A—A of FIG. 2.

Upper and lower seal portions 26b of truncated cone shape are formed at the spool 26. Two reception portions 11a corresponding to the seal portions 26b are formed at the lower tank 11. As shown in FIG. 4, when the relief valve 20 is closed, the seal portions 26b are pressed against the reception portions 11a by the urging force of the disc spring 27 to thereby seal the refrigerant.

Upper and lower passages 11C communicating between the refrigerant chamber 11B and the moving space 11A are formed in the lower tank 11. A relief passage 11D communicating between the space 11A and the outside of the valve 20 is also formed in the lower tank 11. The relief passage 11D is provided to relieve the pressure of the refrigerant chamber 11B to the outside. The external side opening of the relief passage 11D is formed in the vehicle rear side wall surface of the lower tank 11. Due to this, pressure relief direction is directed inward of the engine room B. When the relief valve 20 is closed, the seal portion 26b of the spool 26 shuts off the relief passage 11D from the space 11A. When the spool 26 goes down to open the relief valve 20 and to thereby release the sealing states of the seal portions 26b, the communication between the relief passage 11D and the space 11A is established. It is noted that a rubber plug 12 is fitted into the relief passage 11D from the outside of the valve 20.

The coils 21 are connected to a CPU 31 through a valve driver section 30 and a G sensor (detection means) 32 which is an acceleration sensor used to control an airbag system 33 is connected to the CPU 31. In this embodiment, the solenoid type relief valve 20 is also controlled by using this G sensor 32.

With the above construction, when the vehicle air conditioner is actuated, the refrigerant circulates within the air conditioning cycle and the pressure at the high pressure side of the air conditioning cycle (i.e., the passage from the discharge opening 60a of the compressor 60 to the expansion valve 80a) increases. The condenser 10 has the highest pressure in the cycle. Usually, however, since the solenoid type relief valve 20 is closed, the refrigerant within the lower tank 11 does not leak to the relief passage 11D. Nevertheless, when the G sensor 32 senses deceleration not less than a predetermined value, for example, an impact due to the collision of the vehicle V or the like, then the CPU 31, in response to the sensing of the G sensor 32, supplies current to the respective coils 21 of the relief valve 20 through the valve driver section 30 and excites them. Since the movable iron core 22 is attracted toward the fixed iron core 24 side by the electromagnetic force resulted from this excitation, the push rod 23 goes down and pushes down the spool 26 against the urging force of the disk spring 27 and then the sealing states of the upper and lower seal portions 26b are released (to thereby open the relief valve 22). As a result, the space 11A is communicated with the relief passage 11D. Then, the high pressure refrigerant within the lower tank 11 flows into the relief passage 11D through the passage 11C and the space 11A, drives the rubber plug 12 away from the space 11D and ejects toward the inside of the engine room B. In other words, the high pressure of the refrigerant chamber 11A is relieved to the outside of the valve 20 and the high pressure of the air conditioning cycle is thereby reduced promptly.

As can be understood from the above, according to this embodiment, the impact applied to the vehicle is sensed and the pressure of the high pressure side of the air conditioning cycle is controlled to be discharged from the relief valve to the outside thereof. Due to this, in such a case, i.e., in case of the application of the impact to the vehicle, it is possible to promptly, surely reduce the pressure of the air conditioning cycle.

In addition, by providing the relief valve at the condenser having the highest pressure in the air conditioning cycle, it is possible to more promptly, surely reduce the pressure of the air conditioning cycle.

Moreover, by providing the relief valve at the rear side of the condenser and directing the discharge direction of the refrigerant toward the inside of the engine room, it is possible to suppress the unprepared discharge of the refrigerant to the outside of the valve more effectively.

Next, description will be given to a refrigerant relief device for a vehicle air conditioner in the second embodiment according to the present invention with reference to FIG. 5.

Although the refrigerant relief device in this embodiment is basically the same in overall construction as that in the first embodiment, it differs in the construction of the relief valve. It is noted that the same constituent elements in the refrigerant relief device in this embodiment as those in the first embodiment are denoted by the same reference symbols as those in the first embodiment and that description to their concrete constructions will not be given herein.

Figure 5:
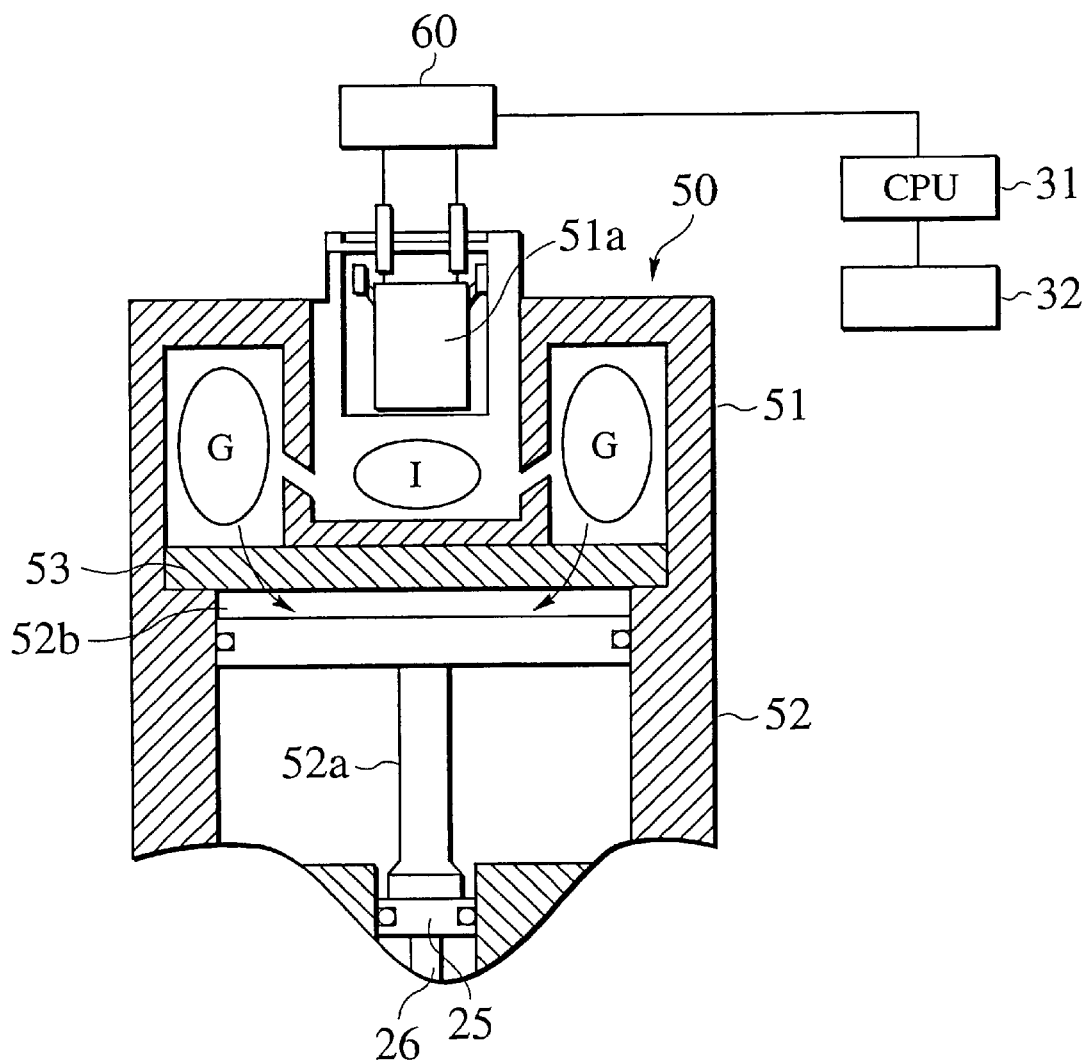
FIG. 5 is a cross-sectional view corresponding to FIG. 4 and showing the main parts of a refrigerant relief valve for a vehicle air conditioner in the second embodiment according to the present invention.

In this embodiment, an inflater type relief valve 50 instead of the solenoid type relief valve 20 in the first embodiment 1, is used as shown in FIG. 5. The inflater 51 causes an ignition agent I to be burned by an electric ignition device 51a called squib to burn a gas generating agent G, thereby generating a gas as in the case of that used in an ordinary airbag system. In this embodiment, as in the case of the first embodiment, there are provided a G sensor 32 and a CPU 31. When the G sensor 32 senses deceleration of not less than a predetermined value, the CPU 31 outputs a drive signal and drives the electric ignition device 51a through a driver section 60.

A cylinder portion 52 having a piston 52a is provided below the inflater 51. When the gas generated by burning the gas generating agent G is filled within a cylinder upper chamber 52b through a filter 53 as indicated by arrows in FIG. 5, pressure is generated and the piston 52a is pressed downward by the generated pressure. A spool 26 similar to that shown in FIG. 4 is coupled, through a joint 25, to the tip end portion of the piston 52a. As the piston 52a goes down, the spool 26 goes down, too. The lower construction of the cylinder portion 52 is exactly the same as the lower construction of the valve in the first embodiment. Namely, as the spool 26 goes down, the relief valve 50 is opened and the high pressure refrigerant within a refrigerant chamber 11B of a lower tank 11 is relieved to the outside of the valve 50.

As can be understood from the above description, according to this embodiment as in the case of the first embodiment, an impact applied to the vehicle is sensed and the pressure of the high pressure side of the air conditioning cycle is controlled to be discharged from the relief valve to the outside thereof. In such a case, i.e., in case of the application of the impact to the vehicle, it is, therefore, possible to promptly, surely reduce the pressure of the air conditioning cycle.

Moreover, the advantage of providing the relief valve at the condenser having the highest pressure in the air conditioning cycle and that of providing the relief valve at the rear side of the condenser and directing the discharge direction of the refrigerant toward the inside of the engine room in this embodiment are the same as those in the first embodiment.

While the discharge direction of the refrigerant gas is directed toward the inside of the engine room in the above-stated embodiments, the direction should not be limited thereto. It may be set to be directed downward of the engine room. Any other direction which has less influence applied to the outside of the valve can be appropriately set.

Also, the position at which the relief valve is installed should not be limited to the condenser itself. Any other position which is on the passage at the high pressure side of the air conditioning cycle, can be appropriately set in view of the vehicle layout or the like.

Furthermore, in the above-stated embodiments, the G sensor is used to sense the impact on the vehicle and the relief valve is electrically actuated under the control of the CPU. It is also possible to actuate the relief valve by a simpler mechanical construction and directly using the impact applied on the vehicle. For example, a construction, in which a valve member for opening the seal portions is provided at the condenser and a connecting member such as a link member mechanically connecting between a vehicle front side portion such as a front bumper and the valve member is also provided, is applicable. With such a construction, when an impact load is applied to the vehicle front side portion, the connecting member functions as, for example, a type of a sensor and a controller. Namely, when the vehicle front side is deformed, the connecting member goes backward and directly opens the valve member, thereby relieving the pressure within the air conditioning cycle.

Additionally, while carbon dioxide is used as the refrigerant of the air conditioning cycle in the above-stated embodiments, the refrigerant should not be limited thereto and other refrigerants used as high pressure refrigerants in the air conditioning cycle may be applicable.

The entire contents of a Patent Application No. TOKUGANHEI 11-37514, with a filing date of Feb. 16, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A refrigerant relief device for a vehicle air conditioner, comprising:
    a detection section detecting an impact applied to a vehicle; and
    a relief section relieving a refrigerant at a high-pressure side of an air conditioning cycle of the vehicle air conditioner to an outside of the air conditioning cycle when the detection section detects the impact.

2. A refrigerant relief device for a vehicle air conditioner according to claim 1, further comprising a control section controlling the relief section so as to relieve the refrigerant at the high pressure side of the air conditioning cycle to the outside thereof when the detection section detects the impact.

3. A refrigerant relief device for a vehicle air conditioner according to claim 1, wherein the relief section relieves the refrigerant at the high pressure side of the air conditioning cycle to an inside of the vehicle and/or downward thereof.

4. A refrigerant relief device for a vehicle air conditioner according to claim 1, wherein the relief section is provided with a solenoid type relief valve.

5. A refrigerant relief device for a vehicle air conditioner according to claim 4, wherein
    the solenoid type relief valve comprises a coil, a movable iron core inserted into the coil, a seal section sealing the refrigerant, and a connecting section connecting the movable iron core with the seal section;
    when the detection section detects the impact, the coil is excited, the movable iron core is moved by an electromagnetic force generated by exciting the coil and the connecting section is moved by moving the movable iron core, thereby opening the seal section connected with the connecting section and relieving the refrigerant at the high pressure side of the air conditioning cycle to the outside thereof.

6. A refrigerant relief device for a vehicle air conditioner according to claim 1, wherein the relief section is provided with an inflater type relief valve.

7. A refrigerant relief device for a vehicle air conditioner according to claim 6, wherein
    the inflater type relief valve comprises a gas generator capable of generating a pressure, a seal section sealing the refrigerant, and a connecting section connecting the gas generator with the seal section;
    when the detection section detects the impact, the gas generator generates a pressure and the connecting section is moved by the pressure, thereby opening the seal section connected with the connecting section and relieving the refrigerant at the high pressure side of the air conditioning cycle to the outside thereof.

8. A refrigerant relief device for a vehicle air conditioner according to claim 1, wherein the detection section is also used for an airbag system of the vehicle.

9. A refrigerant relief device for a vehicle air conditioner according to claim 8, wherein the detection section is provided with an acceleration sensor.

10. A refrigerant relief device for a vehicle air conditioner according to claim 1, wherein the relief section is provided at a condenser of the vehicle air conditioner.

11. A refrigerant relief device for a vehicle air conditioner according to claim 10, wherein the relief section is provided at both ends of a lower tank of the condenser of the vehicle air conditioner.

12. A refrigerant relief device for a vehicle air conditioner, comprising:
    detection means for detecting an impact applied to the vehicle;
    relief means for relieving a refrigerant at a high pressure side of an air conditioning cycle of the vehicle air conditioner to an outside of the air conditioning cycle; and
    control means for controlling the relief means so as to relieve the refrigerant at the high pressure side of the air conditioning cycle to the outside of the air conditioning cycle when the detection means detects the impact.

* * * * *